A. W. DECROW.
SMOKE-PIPE COUPLING.
No. 184,349. Patented Nov. 14, 1876.
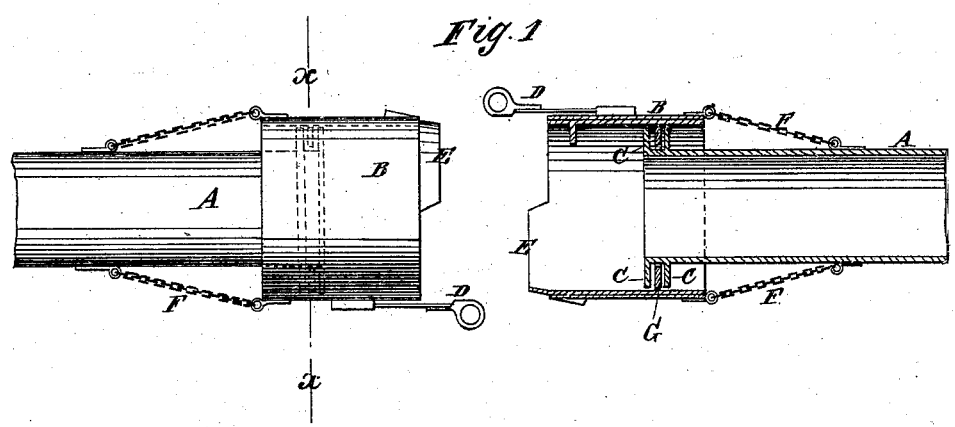
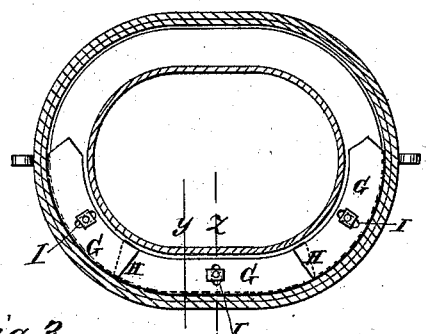
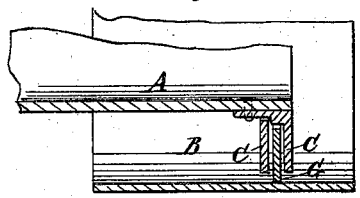
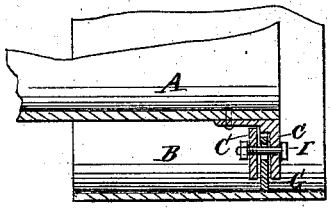
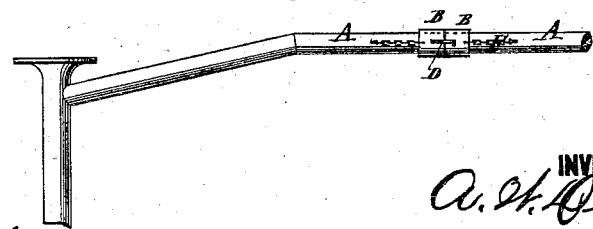
WITNESSES:
INVENTOR:
A. W. Decrow
BY
ATTORNEYS.

UNITED STATES PATENT OFFICE.

ANSON W. DECROW, OF BANGOR, MAINE.

IMPROVEMENT IN SMOKE-PIPE COUPLINGS.

Specification forming part of Letters Patent No. 184,349, dated November 14, 1876; application filed May 1, 1876.

*To all whom it may concern:*

Be it known that I, ANSON W. DECROW, of Bangor, county of Penobscot, and State of Maine, have invented a new and Improved Smoke-Pipe Coupling, of which the following is a specification:

My invention is a coupling-joint for smoke-pipes, to conduct the smoke of a locomotive to the rear of the train over the cars, the said joint being tubes on the ends of the pipes, sliding together over flanges of the pipes, and fastening by spring-catches, with packing at the lower half, resting on the tubes, and rising and falling as the tubes work up and down, the upper half being packed by the tubes resting on the flanges of the pipes.

Figure 1 is a top view of one part and section of the other part of the coupling. Fig. 2 is a transverse section on line $x\ x$ of Fig. 1. Fig. 3 is a section of Fig. 2 on line $y\ y$. Fig. 4 is a section on line $z\ z$, and Fig. 5 is a side elevation of the smoke-pipe of the locomotive and one joint of the conducting-pipe.

Similar letters of reference indicate corresponding parts.

A represents two sections of the conducting-pipe to be coupled. B represents the coupling-tubes; C, flanges on the ends of the pipes A, over which the coupling-tubes slide, to allow of the requisite flexibility of the joint; D, spring-catches for fastening the tubes together; E, projections of the tubes to interlock them against lateral displacement; F, chains to prevent the coupling-tubes from sliding off the pipes, and G the packing-pieces between flanges C in the lower half of the tubes, to rest on the tubes and make close joints, to prevent the escape of the smoke, said packing being in three parts, lapping at H, and being held by bolts I, which allow them to rise and fall, but prevent them from working out of place endwise.

Packing is not needed in the upper half, as the joint is kept tight by the tubes resting on the flanges.

Having thus described my invention, I claim as new and desire to secure by Letters Patent—

1. The combination of coupling-tubes B, having spring-catches D and interlocking projections E, with the pipes A, having flanges C, substantially as specified.

2. The combination of the packing G with the coupling-tubes B and flanged pipes A, substantially as specified.

A. W. DECROW.

Witnesses:
T. B. MOSHER,
ALEX. F. ROBERTS.